United States Patent [19]

Jacob

[11] 4,289,443
[45] Sep. 15, 1981

[54] APPARATUS FOR SINGLY DISCHARGING CYLINDRICAL WORKPIECES FROM AN INCLINED ROLLWAY

[75] Inventor: Charles W. Jacob, Crafton Borough, Pa.

[73] Assignee: United States Steel Corporation, Pittsburgh, Pa.

[21] Appl. No.: 12,407

[22] Filed: Feb. 15, 1979

[51] Int. Cl.³ .............................................. B66F 3/04
[52] U.S. Cl. .................... 414/748; 221/299; 414/126
[58] Field of Search ............... 198/474; 414/745, 747, 414/748, 125, 126, 911, 224; 221/295, 299

[56] References Cited

U.S. PATENT DOCUMENTS

| | | | |
|---|---|---|---|
| 2,763,236 | 9/1956 | Cummings | 414/748 X |
| 2,880,844 | 4/1959 | Vogeli | 198/474 |
| 3,051,290 | 8/1962 | Udall | 414/748 X |
| 3,268,094 | 8/1966 | Fischer et al. | 414/226 |
| 3,411,614 | 11/1968 | Schell | |
| 3,432,076 | 11/1969 | Arsenault | |
| 3,435,962 | 4/1969 | Goeppel | 414/748 |
| 3,724,648 | 4/1973 | Schaller | |

*Primary Examiner*—Frank E. Werner
*Attorney, Agent, or Firm*—William F. Riesmeyer

[57] ABSTRACT

An apparatus is provided for singly discharging laterally aligned cylindrical workpieces from the lower end of an inclined rollway. A rocker having a pivot intermediate its ends is disposed beneath the rollway and has a stop pin pivotally attached to the end of the rocker which is adjacent the lower end of the rollway and an index pin pivotally attached to the end of the rocker which is adjacent the upper end of the rollway. Sleeves are provided to receive the stop and index pins for guiding alternate advance and retract movements thereof into and out of positions projecting from the rollway in the path of the workpieces as the rocker is oscillated about its pivot.

3 Claims, 7 Drawing Figures

APPARATUS FOR SINGLY DISCHARGING CYLINDRICAL WORKPIECES FROM AN INCLINED ROLLWAY

BACKGROUND OF THE INVENTION

1. Field of the Invention

The invention is applicable to apparatus for discharging cylindrical workpieces one at a time from the lower end of an inclined rollway. The workpieces may be of any cylindrical type such as pipes, rolls, or rods. The workpieces roll from an upper end laterally down the incline to a lower end of the rollway.

2. Description of the Prior Art

Known apparatus for singly discharging cylindrical workpieces from a rollway have several disadvantages. First, in some cases the workpieces are ejected over a projecting limit stop and may be subject to damage due to impacts or bouncing during ejection. Such limit stops are shown in U.S. Pat. Nos. 2,880,844 and 3,724,648. Another disadvantage is in the complexity of the apparatus. A separate ejector and auxiliary stop are shown in U.S. Pat. No. 2,880,844. This design not only requires separate actuating mechanisms but sequencing of them to co-ordinate their movements. The apparatus of U.S. Pat. No. 3,432,076 is operated by a single actuating mechanism but has a rather complex linkage controlling operation of a main and auxiliary stop and relies on forces transferred through the linkage to discharge the workpieces.

SUMMARY OF THE INVENTION

According to this invention an apparatus is provided for singly discharging cylindrical workpieces from the lower end of an inclined rollway on which said workpieces are aligned so as to roll laterally down the incline thereof. The apparatus includes a rocker having a pivot intermediate its ends located beneath the rollway and disposed longitudinally with respect thereto so that one end is adjacent a lower end of the rollway and the other end is adjacent the upper end of said rollway. A stop pin is pivotally attached to the end of the rocker adjacent the lower end of the inclined rollway and an index pin is attached to the other end of the rocker. A means is provided for partially rotating the rocker in oscillatory fashion about its pivot alternately advancing and retracting the stop and index pins. A first sleeve means receives the stop pin and guides its advance and retract movements into and out of position projecting upward from said rollway limiting discharge of the lowermost workpiece from the lower end thereof. A second sleeve means receives the index pin and guides its advance and retract movements into and out of position projecting upwardly from the rollway in a location spaced from the stop pin so as to be directed toward the opposite side of the vertical axis of the lowermost workpiece from that contacted by the stop pin. Said index pin serves on its advance movement to simultaneously advance the lowermost workpiece and limit movement of the other workpieces on the rollway while the stop pin is retracted. When the stop pin again advances, the index pin retracts permitting the other workpieces to advance so that the lowermost one rests against the stop pin and the others are laterally aligned therewith.

It is a primary object of this invention to provide an apparatus for singly discharging cylindrical workpieces from the lower end of an inclined rollway on which said workpieces are laterally aligned which overcomes the disadvantages enumerated above, and other objections to the prior art.

It is another object of this invention to provide an apparatus for singly discharging cylindrical workpieces from an inclined rollway by positive movements of said apparatus controlling advance of the workpieces.

These and other objects of this invention will become more apparent from a reading of the following detailed description when taken in conjunction with the appended claims and drawings, in which:

DESCRIPTION OF THE PREFERRED EMBODIMENT

Reference is made to U.S. Pat. No. 3,411,614, the specification of which is incorporated herein, for a showing of an endless chain conveyor for transporting pipe through a heating furnace. Although not limited thereto, the invention of this application will be described in relation to an inclined rollway as shown in the above-identified patent for illustrative purposes.

Figure 1:
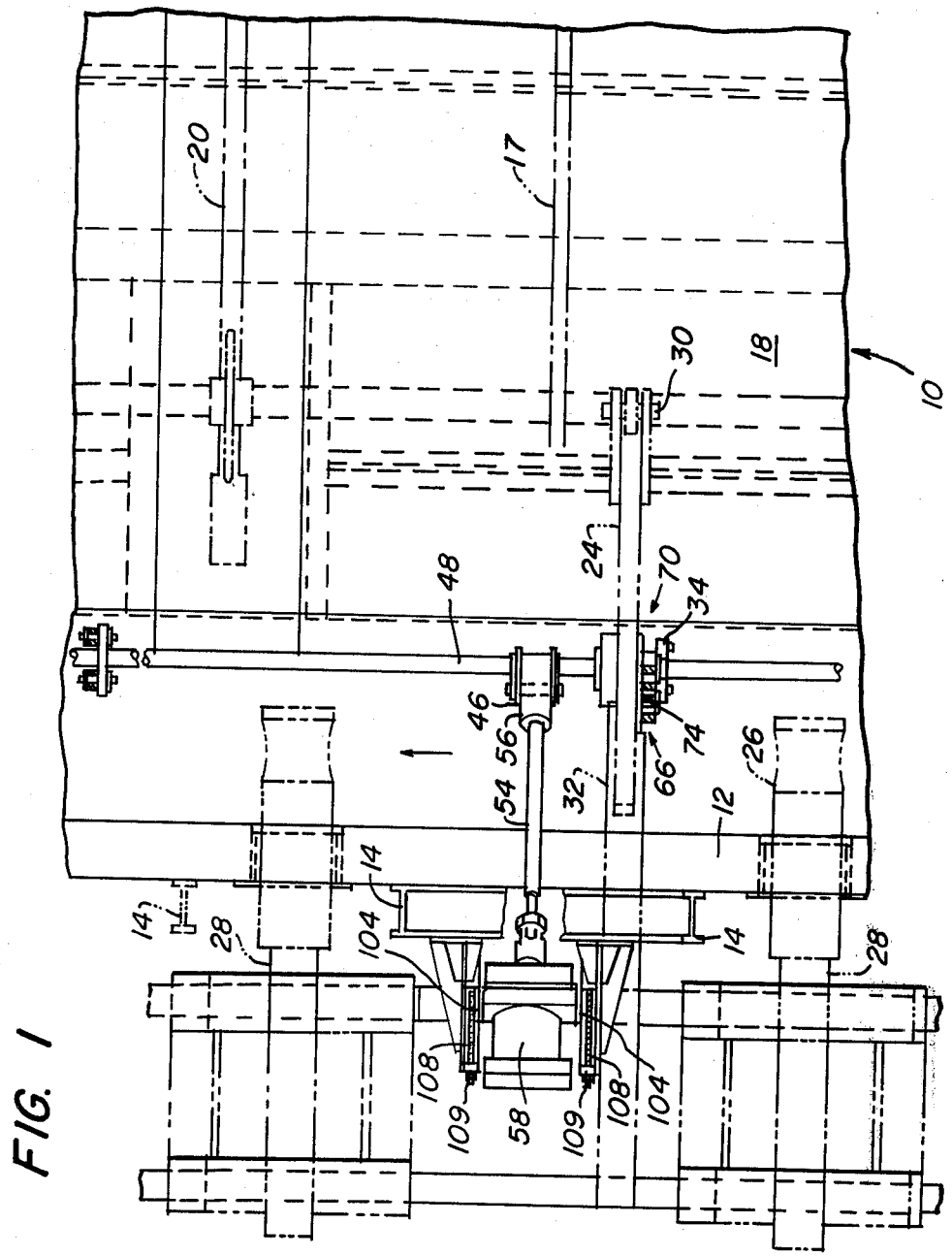
FIG. 1 is a plan view of the apparatus of this invention in conjunction with an inclined rollway at the exit end of a pipe heating furnace.
Figure 2:
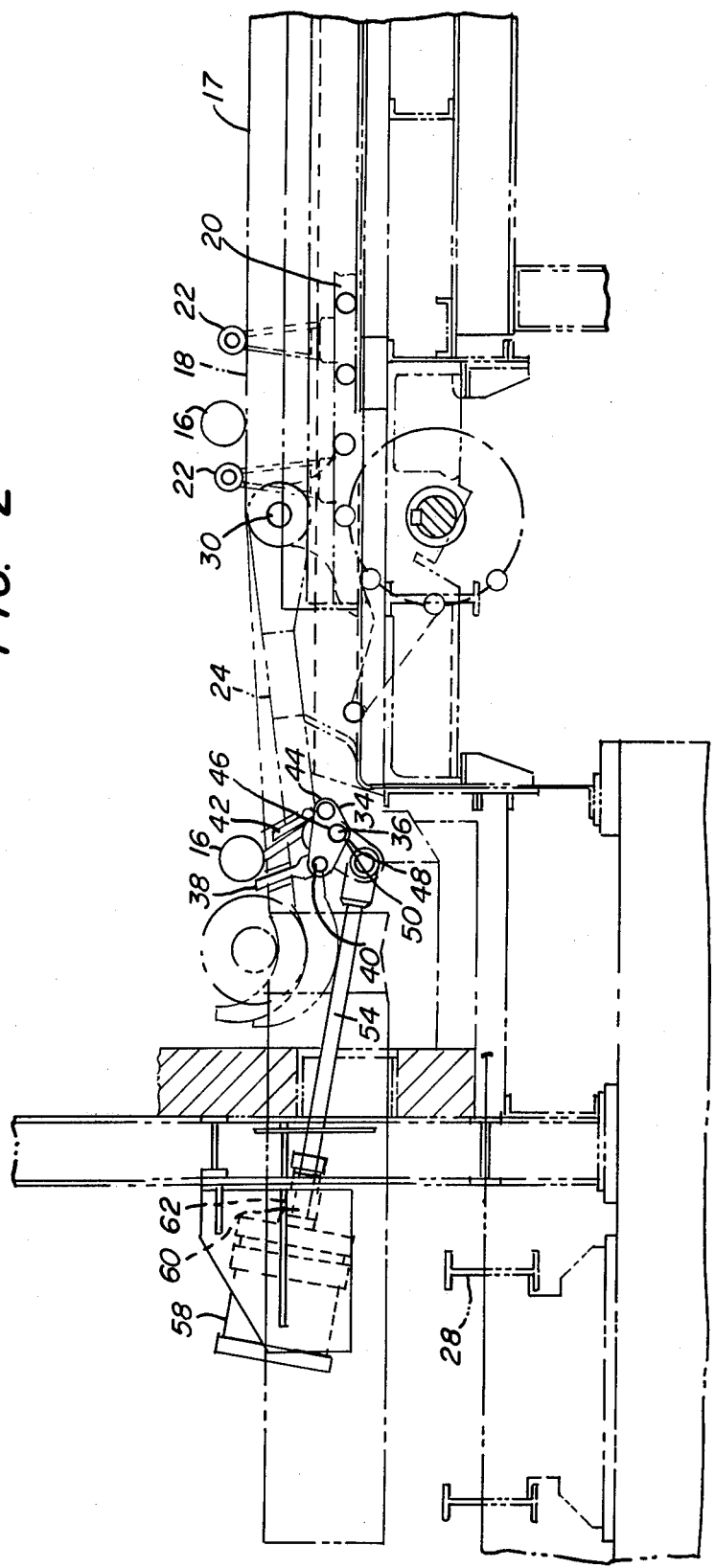
FIG. 2 is an elevation view of the apparatus of FIG. 1.

As shown in FIGS. 1 and 2 furnace 10 includes an outer refractory wall 12 supported by beams 14. Pipes 16 (FIG. 2) rest on skids 17 in elongated bed 18 of furnace 10 as they are being heated and are transported on endless chain conveyor 20 between separator dogs 22 from an entry end of the furnace to the exit end illustrated as right to left in the Figures. At the exit end of the conveyor 20 pipes 16 are deposited on inclined rollway 24, illustrated as sloping rails, which at its lower end is in communication with an outlet conveyor 26. Outlet conveyor 26 transports the pipes longitudinally to a sizing mill (not shown). As is well known in the art, the pipes must be delivered to the sizing mill with their longitudinal axis at the same elevation as the center of the mill regardless of their diameter. Thus, the elevation of outlet conveyor 26 is adjustable by means of elevator 28 illustrated diagrammatically. Inclined rollway 24 is pivotable about a horizontal axis at its upper end at pin 30 so that the elevation of the lower end thereof may be adjusted to correspond with the elevation of outlet conveyor 26. The lower end of inclined rollway 24 rests in saddle 32 (FIG. 1) of elevator 28 and is movable therewith so that the elevation of the lower end of inclined rollway 24 is automatically adjusted to coincide with that of outlet conveyor 26.

Ordinarily, a single pipe is placed between adjacent separator dogs 22 on conveyor 20 so that only one pipe 16 at a time is delivered to inclined rollway 24. However, when heating pipes of relatively small diameter, two or more pipes may be placed between adjacent separator dogs 22 in order to increase the production rate through the furnace. It will be apparent that in this case, two or more pipes are delivered simultaneously to inclined rollway 24 and can cause jam-ups or bottlenecks on outlet conveyor 26 as the pipes are discharged from furnace 10.

Figure 4:
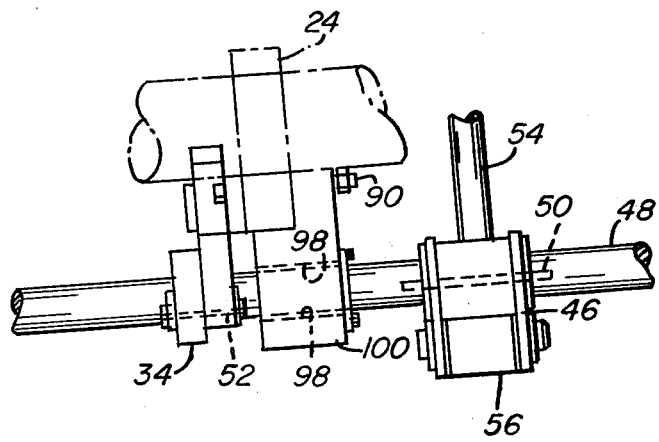
FIG. 4 is a sectional view taken along the lines 4—4 of FIG. 3.

To remedy this situation, an apparatus is provided according to this invention for singly discharging laterally aligned pipes from inclined rollway 24. Referring to FIGS. (1,2,3,4 and 5) the apparatus includes a rocker 34 having a pivot 36 intermediate its ends disposed beneath inclined rollway 24. A stop pin 38 is pivotally attached to rocker 34 on end 40 adjacent the lower end of said inclined rollway. An index pin 42 pivotally attached to end 44 of rocker 34 adjacent the upper end of an inclined rollway 24. Means is provided for oscillating rocker 34 about its pivot 36 to alternately advance and retract stop pin 38 and index pin 42. Referring to FIGS. 2 and 4 said oscillating means includes a lever 46 (FIG. 4) operatively connected to the pivot of said rocker through shaft 48 which lever 46 is secured by key 50, whereas shaft 48 which in turn is secured by key 52 to pivot 36 (FIG. 1) of rocker 34. The end of lever 46 opposite that secured to shaft 48 is pivotally attached to connecting rod 54 by way of clevis 56. A fluid powered cylinder means 58 which may be air or hydraulic operated is provided for advancing and retracting piston rod 60 which in turn is connected by adjustable turnbuckle 62 to the end of connecting rod 54 opposite that secured to lever 46. Multiple rockers and associated stop and index pins may be provided spaced along shaft 48.

Figure 3:
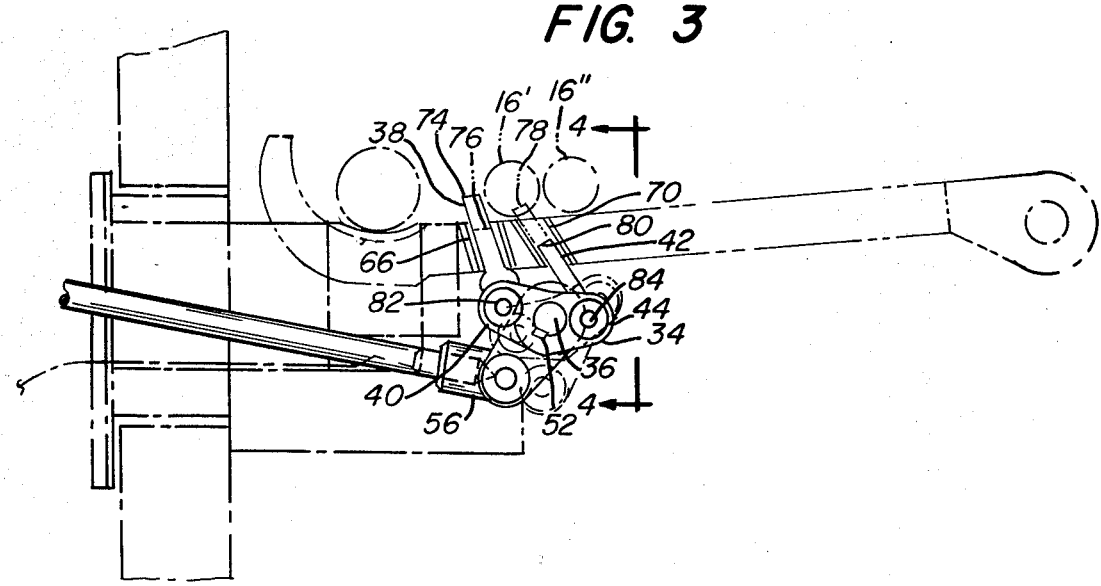
FIG. 3 is an enlarged partial elevation view of the apparatus of FIG. 1.

A first sleeve means 66 (FIG. 3) loosely receives stop pin 38 guiding the advance and retract movements thereof. A second sleeve means 70 (FIG. 3) loosely receives index pin 42 guiding its advance and retract movements. As shown in FIG. 3 when rocker 34 is rotated about pivot 36 so as to advance stop pin 38 to position 74 projecting from inclined rollway 24 it limits discharge of a lowermost pipe 16' from the lower end of the inclined rollway. Rocker 34 is then rotated about pivot 36 to advance index pin 42 to position 78 and simultaneously retract stop pin 38 to position 76. Index pin 42 contacts lowermost pipe 16' on the side of the vertical axis thereof opposite that contacted by stop pin 38 pushing pipe 16' and discharging it from the inclined rollway. In advanced position index pin 42 simultaneously limits movement of the other pipes 16" preventing their discharge from inclined rollway 24 until stop pin 38 is again advanced. When pin 42 is retracted to position 80 the other workpieces 16" advance to their respective positions aligned behind stop pin 38.

Preferably stop pin 38 and index pin 42 are each pivotally attached to rocker 34 by way of pins 82 and 84. First sleeve means 66 is preferably aligned at an acute angle of about 15° with respect to inclined rollway 24 and second sleeve means 70 is preferably aligned at a greater acute angle, about 30° with respect to inclined rollway 24. The angle of inclination provides free movement of the pins in the sleeves.

As mentioned previously inclined rollway 24 is pivotable about a horizontal axis at its upper end by means of pin 30 (FIGS. 1 and 2). The sleeve means 66 and 70 may be separately attached to inclined rollway 24 as shown in FIG. 4 by bolt 90 or may be integral therewith. Rocker 34, as shown in FIG. 4 is pivotally connected through shaft 48, which is journaled in bushing 98 of support block 100, to inclined rollway 24 so as to be movable in conjunction with said rollway and the sleeves. Thus both the rocker and sleeves are movable in conjunction with the rollway so as to automatically compensate for handling pipe of different diameters as the elevation of the rollway is changed.

Figure 5:
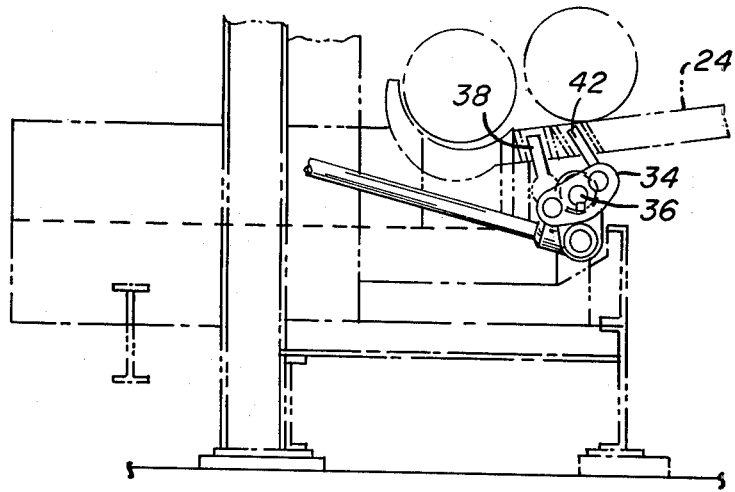
FIG. 5 is an enlarged partial elevation view of the apparatus of FIG. 1 showing the rocker rotated about its pivot so that the stop and index pins do not project from the rollway.
Figure 6:
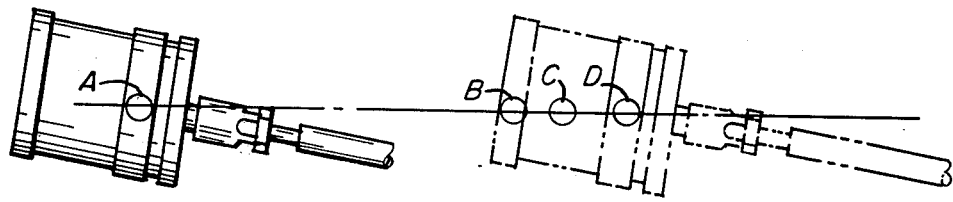
FIG. 6 is an elevation view showing diagrammatically various positions of the cylinder for rotating the rocker about its pivot so that the pins are in neutral or indexing positions as desired.

As shown in FIG. 5, rocker 34 may be selectively rotated about pivot 36 to align stop pin 38 and index 42 in neutral position so that they do not project from inclined rollway 24 allowing free passage of pipes thereover. Means is provided for selectively rotating rocker 34 about its pivot 36 to specific positions for neutrally locating said pins at various elevations of the inclined rollway. This is accomplished by moving cylinder 58 horizontally to various lateral positions which rotates rocker 34 due to the constant length of connecting rod 43, as shown schematically in FIG. 6. As illustrated, for the particular dimensions of our system cylinder 58 in position A locates the stop and index pins in indexing position for handling pipes from $4\frac{1}{2}$ inches diameter to $6\frac{5}{8}$ inches in diameter. In position B the stop and index pins are located in neutral position for handling pipes from 7 inches up to $8\frac{5}{8}$ inches in diameter. In position C the pins are located in neutral position for handling pipes from $9\frac{5}{8}$ inches to $10\frac{3}{4}$ inches in diameter, and in position D the pins are located in neutral position for handling pipes $13\frac{5}{8}$ inches in diameter.

As shown in FIG. 1, cylinder 58 may be moved manually by adjusting bolts 109 engageable with trunnions 104 supporting cylinder 58. Trunnions 104 ride back and forth on slides 108.

Figure 7:
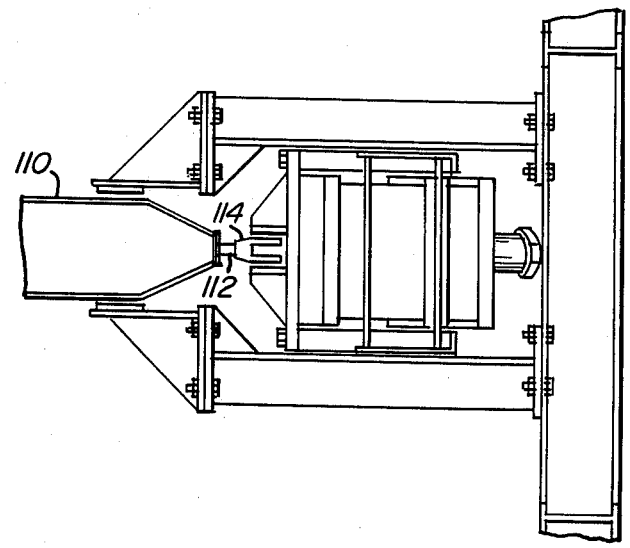
FIG. 7 is a partial plan view of an alternate apparatus for positioning the cylinder.

An alternate means for positioning the cylinder is shown in FIG. 7 and includes an electric actuator such as the type SM2, manufactured by Raco Machine Company of Pennsylvania. The actuator 110 has a screw member 112 attached to cylinder 58 by clevis 114 which moves cylinder 58 along the slides 108. The speed of electric actuator 110 may be adjusted to correspond with the rate of movement of inclined rollway 24 as it is pivoted to various elevations for handling different diameter pipe so that the stop pin and index pins are automatically positioned concurrently with pivotal movement of the inclined rollway. Electric actuator 110 may be controlled by a pulse controller of well known type for controlling the length of time of operation of electric actuator 110 to accomplish the desired positioning of the pins in conjunction with positioning of the rollway, so that they arrive at their prescribed positions simultaneously.

I claim:

1. In an apparatus for singly discharging laterally aligned cylindrical workpieces from the lower end of an inclined rollway, said apparatus including a rocker having a pivot intermediate its ends disposed beneath said rollway, an elongated stop pin pivotally attached to said rocker on the end thereof adjacent the lower end of said rollway, an elongated index pin pivotally attached to said rocker on the end thereof adjacent the upper end of said rollway, said stop and index pins projecting upwardly toward the workpieces on the upper surface of the rollway, means for oscillating said rocker about its pivot to alternately advance and retract said pins, and first and second sleeve means receiving said stop and index pins respectively and for guiding the movements thereof, the improvement in said apparatus which comprises:

said stop pin being aligned substantially normal to the plane of said rollway, said index pin being spaced from the stop pin toward the upper end of the rollway and inclined at an acute angle both with respect to the lower end of said rollway and the axial direction of said stop pin so as to contact the lower most workpiece held by said stop pin on a lower quadrant of the periphery thereof facing the upper end of said rollway, said index pin having a blunt end adjacent said workpieces, an upper surface of said blunt end being substantially parallel to the rollway surface, thus facilitating lifting of workpieces of a range of diameters over said stop pin without adjustment of the alignment of said index pin.

2. The apparatus of claim 1 wherein said rollway is pivotable about a horizontal axis at the upper end thereof, the first and second sleeve means are attached to said rollway for movement therewith, and said rocker is pivotally attached to the rollway for movement therewith in conjunction with said sleeve means.

3. The apparatus of claim 1 further comprising means for selectively rotating said rocker about its pivot to a position where neither of the stop or index pins project from the rollway allowing passage of the workpieces freely thereover.

* * * * *